210-449
Examiner
6
BEST AVAILABLE COPY
D. N. B. Coffin Jr.
Water Filter.
No. 162. A. I. Apr. 14, 1857.
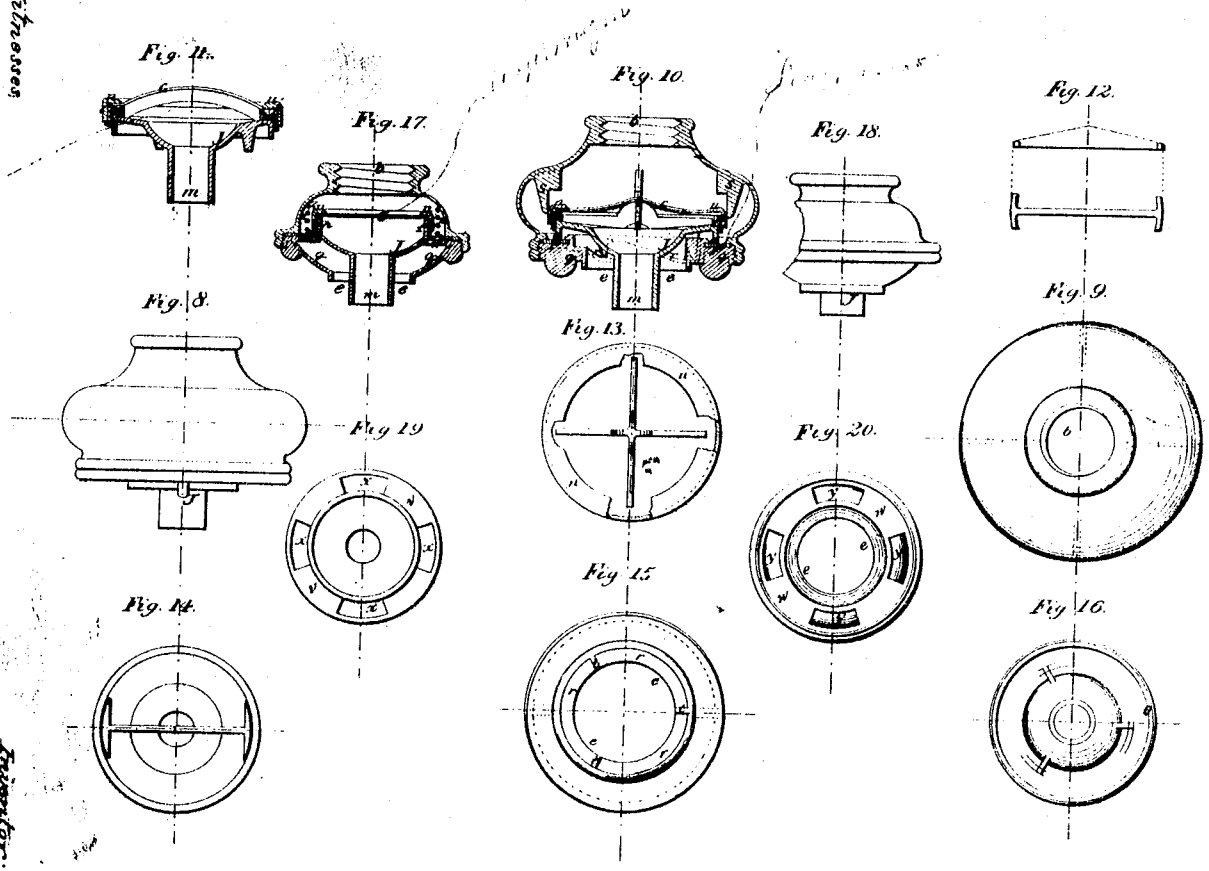
Witnesses:
J. D. Spaulding
L. E. Coffin
Inventor:
David N. B. Coffin Jr.

BEST AVAILABLE COPY

UNITED STATES PATENT OFFICE.

COMFORT B. THORP, OF SMITHFIELD, RHODE ISLAND.

SHUTTLE-TONGUE FOR SECURING AND HOLDING THE COP OF WOOF.

Specification of Letters Patent No. 162, dated April 17, 1837.

*To all whom it may concern:*

Be it known that I, COMFORT B. THORP, of Smithfield, in the county of Providence and State of Rhode Island, have invented a new and improved mode of more effectually securing and holding the cop of woof upon the tongues of the common power loom shuttles than the mode now in use, preventing the cops of woof from sliding off from the tongues while weaving, especially the last part of them, which so frequently slips from the common smooth tongues and is drawn into the web, injuring the cloth and wasting yarn.

My improvement consists of ridges, or parts jutting from the surface of said tongues, protruding into the cop, against which the innermost turns or coils of the woof will lodge, and prevent the cops sliding from the tongues. There are various ways to form or produce said projectures or protuberances, such as cutting long notches in the corners of a square tongue, leaving the prominences extending out the full size of the square resembling in some degree the tooth of a saw, the point or cutting part of which will stand toward the heel or pivot of the tongue, and about five-eights of an inch apart on each corner and so arranged that neither of them will come opposite of each other; the square of the tongue should be equal to the square of the hole in the cop. Also by forming a worm or a spiral projecting lip or edge around the surface of the round tongues or by cutting notches therein.

The most convenient way to form and use the improvement on the common smooth round tongue, will be to wind a piece of wire around it, spirally, beginning at the head of the tongue near its pivot, and forming about eight turns more or less onward toward its point, each turn should be three-eighths of an inch apart or thereabout. The wire should be the sixteenth of an inch in diameter, though it may vary from that size and confined to the tongue by solder or by brazing. It is necessary that the tongues should be made so small in size as to protrude into the cop with ease, before the wire is put on to said tongue. The most handy way to put the cop on to the screw tongue will be to slip the cop on to its point until it comes to the worm and then with one hand, hold the cop, and whirl the shuttle round.

What I claim as my invention, and desire to secure by Letters Patent, is—

The above described projectures whose prominences protrude into the cop for the purpose of more effectually securing and holding the cop of woof on upon said tongues. Also the application of the worm, or the spiral projecting lip or edge to the round tongue as herein described for the purpose of holding and preventing the cop from slipping off from the tongues of the shuttles while weaving.

COMFORT B. THORP.

Witnesses:

ASA WINSOR,

ELIZA T. WINSOR.